US007800538B2

(12) United States Patent
Crouch et al.

(10) Patent No.: US 7,800,538 B2
(45) Date of Patent: Sep. 21, 2010

(54) POWER COMBINING AND ENERGY RADIATING SYSTEM AND METHOD

(75) Inventors: David D. Crouch, Corona, CA (US); David J. Canich, Upland, CA (US); Kenneth A. Nicoles, Upland, CA (US); Alan A. Rattray, Alta Loma, CA (US)

(73) Assignee: Raytheon Company, Waltham, MA (US)

( * ) Notice: Subject to any disclaimer, the term of this patent is extended or adjusted under 35 U.S.C. 154(b) by 999 days.

(21) Appl. No.: 11/588,794

(22) Filed: Oct. 27, 2006

(65) Prior Publication Data

US 2008/0144689 A1 Jun. 19, 2008

(51) Int. Cl.
*H01Q 3/00* (2006.01)
*H01Q 21/06* (2006.01)
*H01Q 21/24* (2006.01)
*H04B 7/10* (2006.01)

(52) U.S. Cl. ...................................... 342/372; 342/361

(58) Field of Classification Search .................. 342/372
See application file for complete search history.

(56) References Cited

U.S. PATENT DOCUMENTS 4,672,384 A * 6/1987 Roy et al. .................... 343/725
4,755,829 A 7/1988 Dinger et al.
5,179,386 A * 1/1993 Rudish et al. ............... 342/371
5,966,048 A * 10/1999 Thompson .............. 330/124 R
6,535,180 B1 * 3/2003 Gregorwich et al. ........ 343/895
6,788,139 B2 * 9/2004 Villemazet et al. .......... 330/149
2003/0179139 A1 9/2003 Nemit et al.
2005/0073461 A1 4/2005 Norvell et al.
2006/0007044 A1 1/2006 Crouch et al.

OTHER PUBLICATIONS

Tanaka, T., et al., “Circularly Polarized Printed Antenna Combining Slots and Patch”, *IEICE Transactions on Communications, Communications society, E9OB (3)*, (Mar. 1, 2007), 621-629.

* cited by examiner

*Primary Examiner*—Thomas H Tarcza
*Assistant Examiner*—Harry Liu
(74) *Attorney, Agent, or Firm*—Schwegman, Lundberg & Woessner, P.A.; Gregory J. Gorrie

(57) ABSTRACT

A power-combining system and method for generating a high-power coherent wavefront are generally described herein. Other embodiments may be described and claimed. The power-combining system comprises a combining-radiating assembly having a plurality of ports. Phase controllers generate signals with a predetermined phase shift for an associated one of the ports. Pluralities of coherent sources receive signals from an associated one of the phase controllers and to provide the signals to an associated port of the combining-radiating assembly with the predetermined phase shifts. Energy from the ports is coherently combined and radiated to provide a coherent high-power wavefront. In some embodiments, the combining-radiating assembly comprises a conductive patch having a plurality of ports spaced uniformly around the patch. In these embodiments, energy from the ports is coherently combined and radiated by the patch to provide the coherent high-power wavefront.

31 Claims, 4 Drawing Sheets

POWER-COMBINING SYSTEM

POWER-COMBINING SYSTEM

FOUR PORT COMBINING-RADIATING ASSEMBLY

EIGHT PORT COMBINING-RADIATING ASSEMBLY

ACTIVE ARRAY ANTENNA SYSTEM

POWER COMBINING AND ENERGY RADIATING SYSTEM AND METHOD

TECHNICAL FIELD

Some embodiments of the present invention pertain to the generation and transmission of microwave and/or millimeter wave energy. Some embodiments relate to power combining. Some embodiments relate to wireless communication systems. Some embodiments relate to active array antenna systems.

BACKGROUND

Many conventional power-combining techniques generate high-power signal levels by combining the outputs of multiple transistor amplifiers or transistor-amplifier cells. These conventional techniques require complex matching networks due to the very low output impedances of the high-power devices. Other conventional power-combining techniques use stripline or microstrip circuits to combine the outputs of multiple amplifiers. These conventional power-combining techniques require significant circuit area compared with the area occupied by the amplifier devices. The failure of an amplifier device may result in an impedance mismatch that may significantly degrade the performance of the power combiner.

Thus, there are general needs for systems that can generate high-power signal levels that do not require complex matching networks. There are also general needs for systems that can generate high-power signal levels that do not require significant circuit area as compared with the area occupied by the amplifier.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
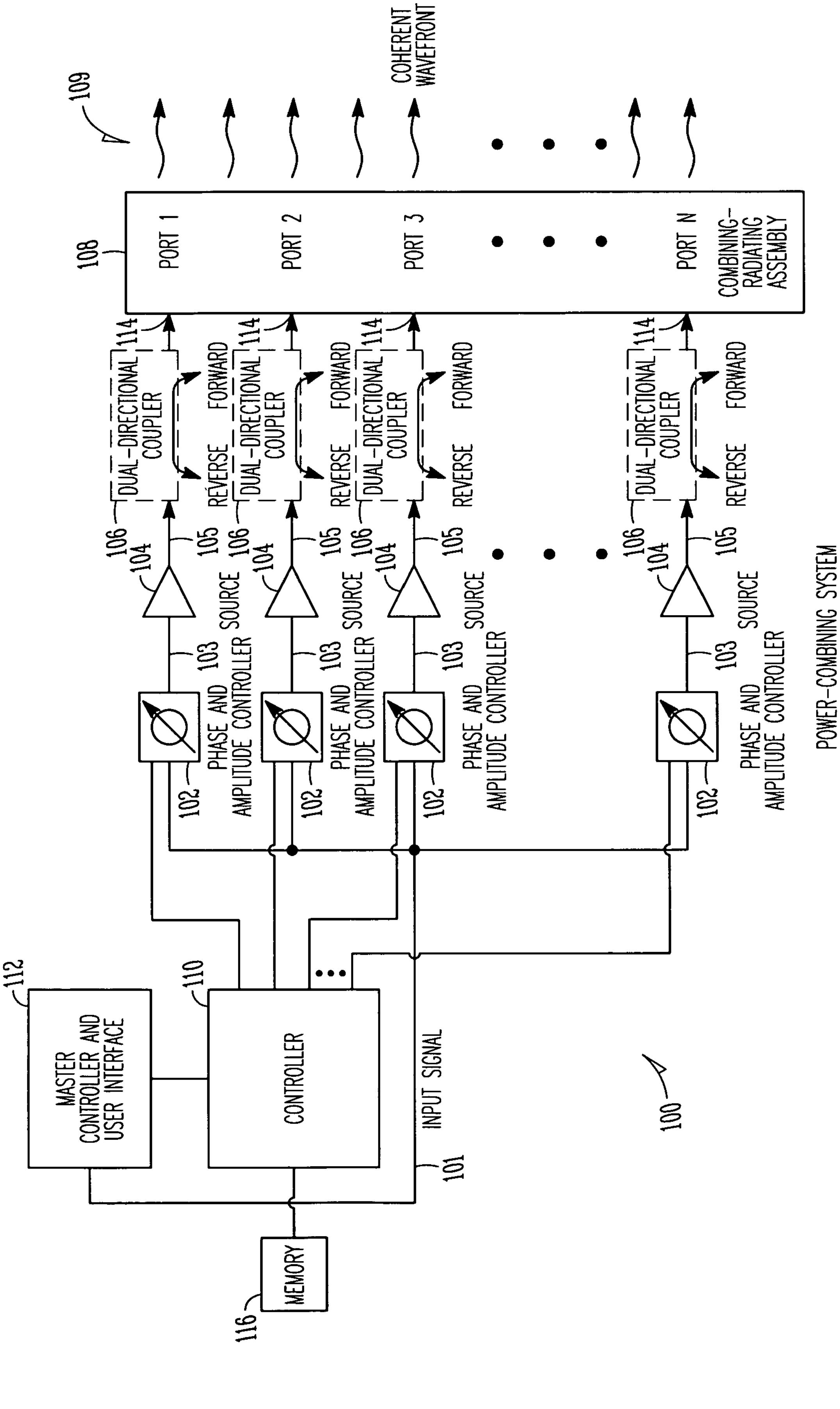
FIG. 1 is a functional block diagram of a power-combining system in accordance with some embodiments of the present invention.

FIG. 1 is a functional block diagram of a power-combining system in accordance with some embodiments of the present invention. Power-combining system 100 may be used to generate coherent high-power wavefront 109. In these embodiments, power-combining system 100 may include combining-radiating assembly 108 and phase controllers 102. Combining-radiating assembly 108 has a plurality of ports 114. Phase controllers 102 may generate signals with a predetermined phase shift for an associated one of ports 114. Power-combining system 100 may also include a plurality of coherent sources 104 to receive signals from an associated one of phase controllers 102 and to provide signals 105 to an associated port 114 with a predetermined phase shift. In these embodiments, energy from ports 114 may be coherently combined and radiated by combining-radiating assembly 108 to generate coherent high-power wavefront 109. As used herein, the term 'coherent wavefront' refers to a propagating electromagnetic wavefront of substantially constant phase.

In accordance with embodiments of the present invention, the energy provided to ports 114 is not spatially combined in free space, as in a spatial combiner or phased-array. The energy is concurrently combined within and radiated by combining-radiating assembly 108. In some embodiments, combining-radiating assembly 108 may operate as an antenna that transmits the combined energy.

In some embodiments, combining-radiating assembly 108 may comprise a patch with ports 114 around the patch. The patch may combine signals 105 and may radiate coherent high-power wavefront 109. In these embodiments, the patch may operate as an antenna that transmits the combined energy. In some embodiments, ports 114 may be spaced uniformly around the patch. In some embodiments, the patch may be circular and ports 114 may be uniformly spaced (e.g., radially) around the patch, although the scope of the invention is not limited in this respect as other shaped patches may also be suitable. In some of these embodiments, the patch may comprise a conductive material having either a substantially circular shape or a substantially regular polygonal shape, although the scope of the invention is not limited in this respect. Some examples of the patch are discussed in more detail below. In some alternate embodiments, combining-radiating assembly 108 may comprise a linear-polarized horn antenna having an integrated coaxial-to-waveguide combiner to coherently combine energy from ports 114.

In some embodiments, the use of combining-radiating assembly 108 may lessen and possibly even eliminate the need for circuit-based power combiners. Furthermore, in some embodiments, polarization diversity may be achieved by selectively setting the phase at each port 114 of combining-radiating assembly 108. In addition, in some embodiments, control over the phase at each port 114 may allow power-combining system 100 to at least partially compensate for degradation and possibly even failure of one or more of the signal paths.

In some embodiments, power-combining system 100 may be used to transmit information wirelessly and may be part of a wireless communication system. In some other embodiments, power-combining system 100 may be part of an active array antenna system. These embodiments are described in more detail below.

In some embodiments, output signals 105 from coherent sources 104 may comprise either microwave or millimeter-wave frequency signals. In some embodiments, each of coherent sources 104 may provide one of output signals 105 whose phase is set by that of an associated one of input signals 103 provided by an associated one of phase controllers 102. In these embodiments, the microwave frequencies may generally range between approximately one and 30gigahertz (GHz) and the millimeter-wave signals may generally range between approximately 30 and 300 GHz, although the scope of the invention is not limited in this respect.

In some embodiments, each of coherent sources 104 may comprise a phase-locked oscillator to provide one of output signals 105 that is phase-locked to an associated one of input signals 103. In some embodiments, the output frequency and output phase of output signals 105 may be phase locked to common input signal 101, although the scope of the invention is not limited in this respect.

In some embodiments, each of coherent sources 104 may comprise up to several hundred or more small low-power amplifiers (e.g., one or more transistor cells) having relatively high input and output impedances (e.g., 50 Ohms), although the scope of the invention is not limited in this respect. These amplifiers may be matched using conventional microwave design techniques, although the scope of the invention is not limited in this respect. In some other embodiments, one or more of coherent sources 104 may comprise a traveling wave tube amplifier (TWTA) to provide output signals 105 whose phase is set by the phase of an associated one of input signals 103. In some other embodiments, one or more of coherent sources 104 may comprise a klystron amplifier or a solid-state amplifier, although other amplifiers may also be suitable. In these embodiments, the phase at the output of coherent sources 104 is determined by the phase at the input.

In some of these embodiments, coherent sources 104 generate output signals 105 of substantially uniform amplitude for combining and radiating by combining-radiating assembly 108, although in other embodiments, the amplitude of output signals 105 may be varied. These embodiments are discussed in more detail below.

As illustrated in FIG. 1, power-combining system 100 may include controller 110 coupled to phase controllers 102 to set the phase of signals at ports 114 of combining-radiating assembly 108 to generate coherent high-power wavefront 109. In some embodiments, controller 110 may be coupled to phase controllers 102 to set a phase progression of the signals at ports 114 to generate coherent high-power wavefront 109 with circular polarization.

In some embodiments, controller 110 may provide for on-the-fly polarization by setting a phase of the signals at ports 114 to selectively provide one of a right-hand circularly polarized wavefront, a left-hand circularly polarized wavefront, a horizontally polarized wavefront or a vertically polarized wavefront.

In some embodiments, controller 110 may set the phase shifts for each of phase controllers 102 based on an initial calibration for each port 114. In some embodiments, memory 116 may store a predetermined phase offset and/or amplitude offset for each port 114 based on the initial calibration to provide the predetermined phase shift at each port 114 during operation. In these embodiments, controller 110 may cause phase controllers 102 to offset the phase and/or amplitude for each port 114 based on the predetermined phase offset and amplitude offset stored in memory 116. In some of these embodiments, phase controllers 102 may be phase and amplitude controllers. In these embodiments, during calibration, the phase and/or amplitude for each port 114 may be optimized so that reflected power at each port 114 is minimized. In these embodiments, rather than minimizing reflections and matching the input for each of ports 114 individually, reflections from all ports 114 may be minimized concurrently. In this way, maximum power may be transferred to combining-radiating assembly 108 for combining and radiating.

In some embodiments, power-combining system 100 may also include optional dual-directional couplers 106 in the signal path prior to ports 114. Dual directional couplers 106 may be used to measure incident and reflected power from ports 114 during operation. Data derived from these measurements may be used as part of a built-in-test system. Dual-directional couplers 106 may also be used to monitor reflected energy from ports 114 during calibration to determine the phase and/or amplitude offsets for use by controller 110.

In some embodiments, combining-radiating assembly 108 may have N ports 114 while possessing N-fold rotational symmetry. In these embodiments, combining-radiating assembly 108 may be geometrically invariant to rotations of 360/N degrees. In these embodiments, a phase progression of ±360 degrees divided by N may be set between ports 114 by controller 110 to generate coherent high-power wavefront 109 with either right-hand or left-hand circular polarization, depending on the sign of the phase progression.

In some embodiments, power-combining system 100 may be coupled to master controller and user interface 112. Master controller and user interface 112 may allow a user to select and set the type of polarization (i.e., right-hand circular, left-hand circular, vertical linear, horizontal linear) of coherent wavefront 109 as well as the power level of coherent wavefront 109. Master controller and user interface 112 may also be used during calibration. In some embodiments, master controller and user interface 112 may be used to steer and/or direct coherent high-power wavefront 109 in various directions, although the scope of the invention is not limited in this respect. These embodiments are discussed in more detail below.

Figure 2A:
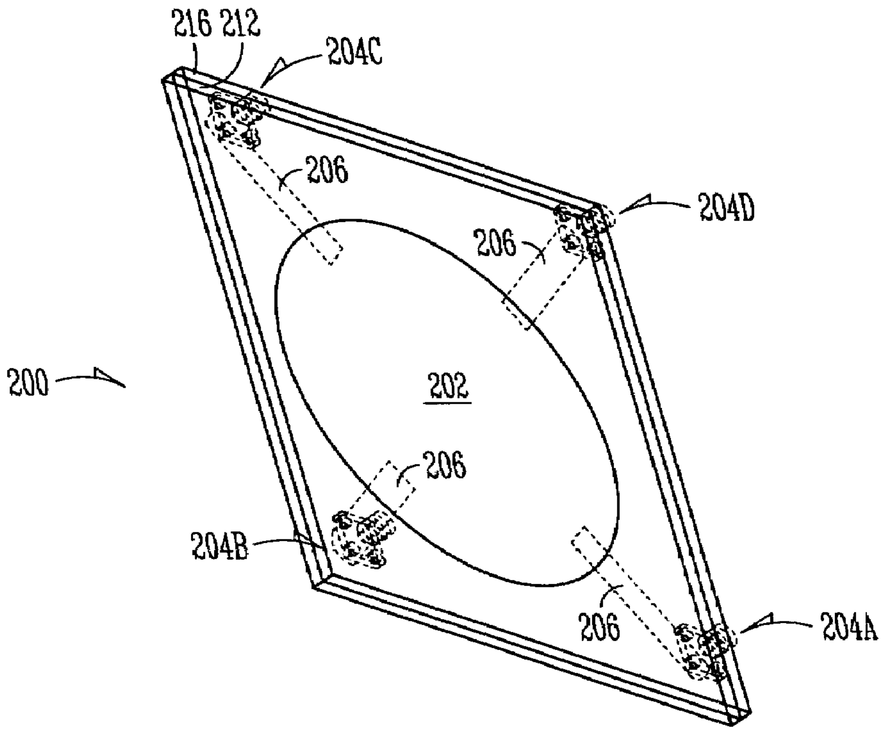
FIG. 2A illustrates a perspective view of a four port combining-radiating assembly in accordance with some embodiments of the present invention.

FIG. 2A illustrates a perspective view of a four port combining-radiating assembly in accordance with some embodiments of the present invention. Four port combining-radiating assembly 200 may be suitable for use as combining-radiating assembly 108 (FIG. 1), although other combining-radiating assemblies may also be suitable. Combining-radiating assembly 200 may include ports 204A, 204B, 204C and 204D and patch 202. Conductive strips 206 may couple one of ports 204A, 204B, 204C and 204D to patch 202. In these embodiments, patch 202 may be fabricated on first insulating substrate 212 and conductive strips 206 may be fabricated on second insulating substrate 216. In these embodiments, ports 204A, 204B, 204C and 204D may correspond to ports 114 (FIG. 1).

In some four-port embodiments (i.e., N=4), four ports 204A, 204B, 204C and 204D may generate coherent wavefront 109 (FIG. 1) with right-hand circular polarization. In these embodiments, controller 110 (FIG. 1) sets the relative phase at port 204A to zero degrees, the relative phase at port 204B to 90 degrees, the relative phase at port 204C to 180 degrees, and the relative phase at port 204D to 270 degrees. In these four-port embodiments, to generate wavefront 109 (FIG. 1) with left-hand circular polarization, controller 110 (FIG. 1) sets the relative phase at port 204A to zero degrees, the relative phase at port 204B to −90 degrees, the relative phase at port 204C to −180 degrees, and the relative phase at port 204D to −270 degrees. In these same four-port embodiments, to generate wavefront 109 (FIG. 1) with horizontal linear polarization, controller 110 (FIG. 1) sets the relative phases at ports 204A and 204D to zero degrees and the relative phase at ports 204B and 204C to 180 degrees. In these four-port embodiments, to generate wavefront 109 (FIG. 1) with vertical linear polarization, controller 110 (FIG. 1) sets the relative phases at ports 204A and 204B to zero degrees and the relative phase at port 204C and 204D to 180 degrees.

In these four-port embodiments when four ports 204A, 204B, 204C and 204D are used to generate coherent wavefront 109 (FIG. 1) with either horizontal or vertical linear polarization, ports 204A, 204B, 204C and 204D may be spaced substantially ninety degrees apart from each other around patch 202 as illustrated in FIG. 2A, although the scope of the invention is not limited in this respect. Controller 110 (FIG. 1) may set the relative phase of signals provided to two adjacent ports (i.e., ports 204A and 204B) to be substantially in-phase with each other, and may set the relative phase of the signals provided to two opposite ports (i.e., ports 204C and 204D) to be substantially 180 degrees (i.e., out-of-phase with ports 204A and 204B) to generate coherent wavefront 109 (FIG. 1) having a linear polarization. In these embodiments, the linear polarization may be either horizontal or vertical depending on which adjacent ports are provided the in-phase signals. In these four-port embodiments that generate coherent wavefront 109 (FIG. 1) with a linear polarization, the amplitude of the signals at each of the four ports may be the same, although the scope of the invention is not limited in this respect.

In some embodiments, patch 202 may have a circular shape, as illustrated in FIG. 2A. In some other embodiments, patch 202 may have a rectangular or square shape with multiple ports arranged on opposite sides of the patch. In these other embodiments, the phases of the signals provided at the ports may be selected to provide a linearly-polarized wavefront. In these embodiments, the rectangular or square shaped patch may have four or more ports.

In some eight port embodiments (N=8), eight ports may be used to generate a wavefront with either right-hand or left-hand circular polarization. In some other eight port embodiments, eight ports may be used to generate a coherent wavefront with a linear polarization. These embodiments are described in more detail below.

Figure 2B:
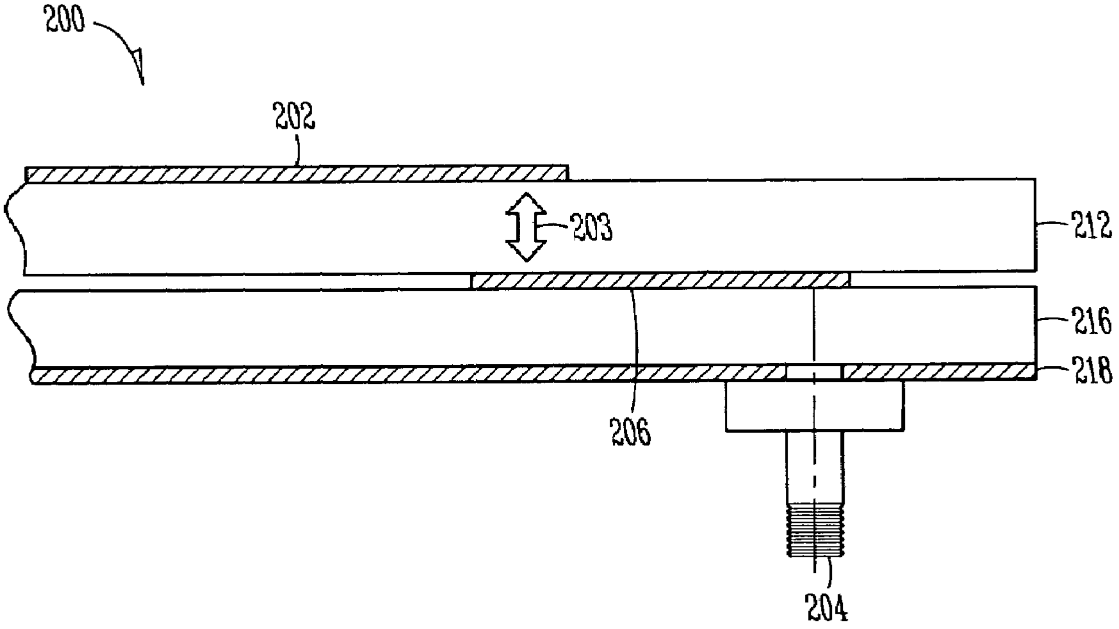
FIG. 2B illustrates a side view of a portion of a combining-radiating assembly in accordance with some embodiments of the present invention.

FIG. 2B illustrates a side view of a portion of a combining-radiating assembly in accordance with some embodiments of the present invention. FIG. 2B illustrates first non-conductive substrate 212 having patch 202 disposed thereon, and second non-conductive substrate 216 having conductive strips 206 disposed thereon. In some embodiments, each conductive strip 206 may signal-couple one of ports 204 to patch 202. Second non-conductive substrate 216 may have ground plane 218 disposed on the side opposite of conductive strips 206. Port 204, illustrated in FIG. 2B, may correspond to any one or more of ports 204A-204D (FIG. 2A).

In some embodiments, first and second non-conductive substrates 212 & 216 may comprise printed circuit boards (PCBs), such as Duroid or alumina, although other non-conductive substrate materials may also be suitable. In some embodiments, patch 202, conductive strips 206 and ground plane 218 may comprise a conductive material such as copper, gold, aluminum and/or silver, although the scope of the invention is not limited in this respect.

In some embodiments, ports 204 may comprise electromagnetically-coupled ports. In these embodiments, electromagnetic signals 203 may be coupled between conductive strips 206 and patch 202. In these embodiments, each port 204 may comprise an open-ended conductive strip 206 disposed on non-conductive substrate 216 to couple electromagnetic energy from each conductive strip 206 to patch 202. In these embodiments, open-ended conductive strips 206 may extend and terminate under patch 202 as illustrated. In these electromagnetically-coupled embodiments, open-ended conductive strips 206 may be electrically insulated from patch 202, although the scope of the invention is not limited in this respect. In some of these embodiments, open-ended conductive strips 206 may comprise microstrip feed lines, although the scope of the invention is not limited in this respect.

In the embodiments illustrated in FIGS. 2A and 2B, ports 204 may comprise a connector, such as an SMA connector, although the scope of the invention is not limited in this respect. The center conductor of each connector may couple with one of conductive strips 206.

Figure 3:
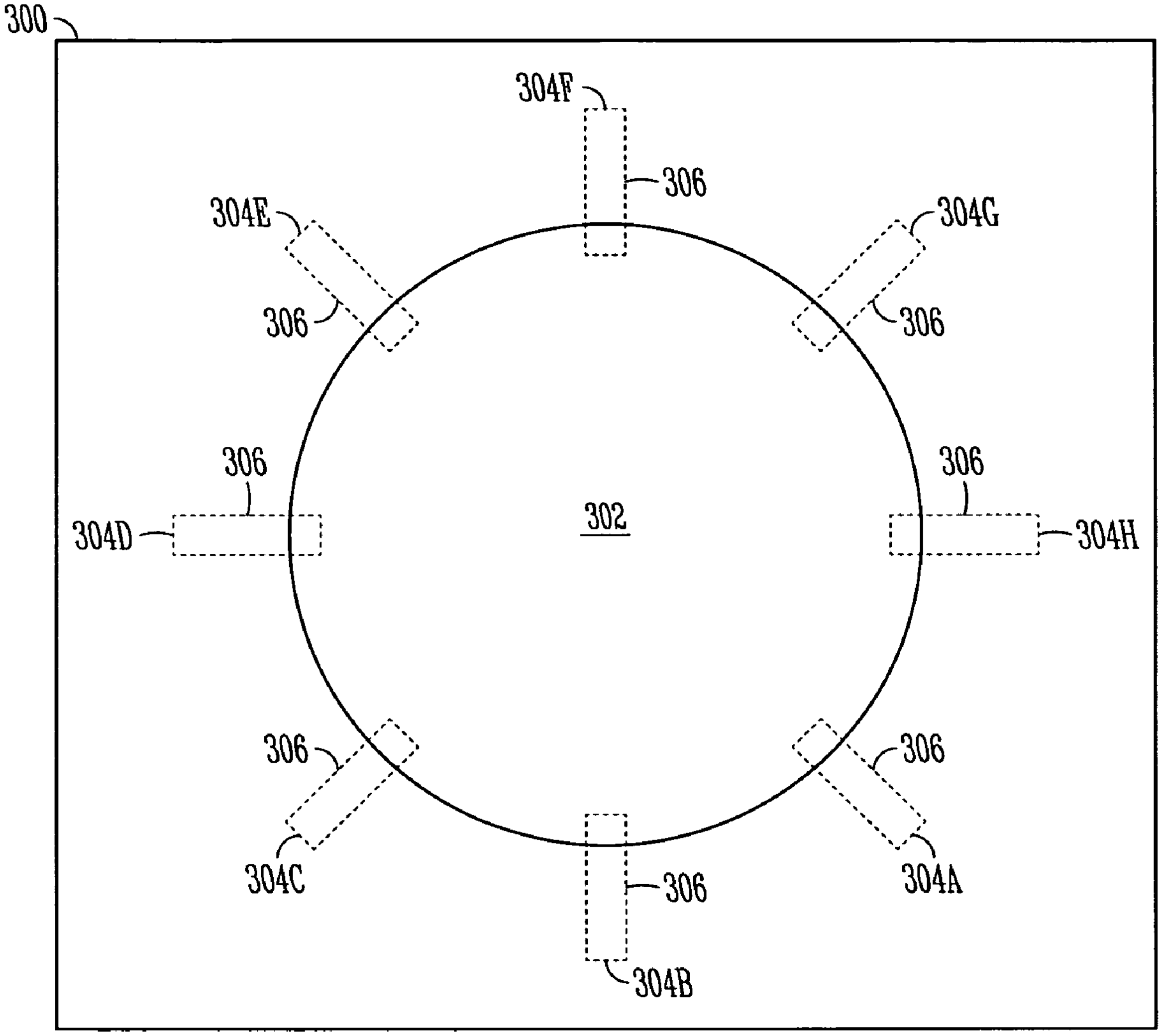
FIG. 3 illustrates a top view of an eight port combining-radiating assembly in accordance with some embodiments of the present invention.

FIG. 3 illustrates a top view of an eight port combining-radiating assembly in accordance with some embodiments of the present invention. Eight port combining-radiating assembly 300 may be suitable for use as combining-radiating assembly 108 (FIG. 1), although other combining-radiating assemblies may also be used. Eight port combining-radiating assembly 300 may include patch 302, which may be similar to patch 202 (FIGS. 2A & 2B), conductive strips 306, which may be similar to conductive strips 206 (FIGS. 2A & 2B), and ports 304A-304H, which may be similar to ports 204A-204D (FIG. 2A) or port 204 (FIG. 2B). In these embodiments, patch 302 may be fabricated on a first insulating substrate, which may be similar to first insulating substrate 212 (FIG. 2B), and conductive strips 306 may be fabricated on a second insulating substrate, which may be similar to second insulating substrate 216 (FIG. 2B), although the scope of the invention is not limited in this respect.

In these eight port embodiments (N=8), to generate wavefront 109 (FIG. 1) with right-hand circular polarization, controller 110 (FIG. 1) sets the relative phase at port 304A to zero degrees, the relative phase at port 304B to 45 degrees, the relative phase at port 304C to 90 degrees, the relative phase at port 304D to 135 degrees, the relative phase at port 304E to 180 degrees, the relative phase at port 304F to 225 degrees, the relative phase at port 304G to 270 degrees, and the relative phase at port 304H to 315 degrees. In these eight port embodiments, to generate wavefront 109 (FIG. 1) with left-hand circular polarization, controller 110 (FIG. 1) sets the relative phase at port 304A to zero degrees, the relative phase at port 304B to −45 degrees, the relative phase at port 304C to −90 degrees, the relative phase at port 304D to −135 degrees, the relative phase at port 304E to −180 degrees, the relative phase at port 304F to −225 degrees, and the relative phase at port 304G to −270 degrees, and the relative phase at port 304H to −315 degrees. In these eight port embodiments that generate a coherent wavefront with circular polarization, the amplitude of the signals at each of ports 304A-304H may be the same, although the scope of the invention is not limited in this respect.

Although patch 302 is illustrated as having a circular shape, the scope of the invention is not limited in this respect. In alternate embodiments, patch 302 may have regular polygonal shape (e.g., octagonal).

In some alternate embodiments, ports 304A-304H may be used to generate wavefront 109 (FIG. 1) with either horizontal or vertical linear polarization. In these embodiments, controller 110 (FIG. 1) may adjust (e.g., reduce) the amplitude of signals 105 (FIG. 1) provided to some of the ports, although the scope of the invention is not limited in this respect. For example, alternate ports may be set to lower amplitude levels.

Figure 4:
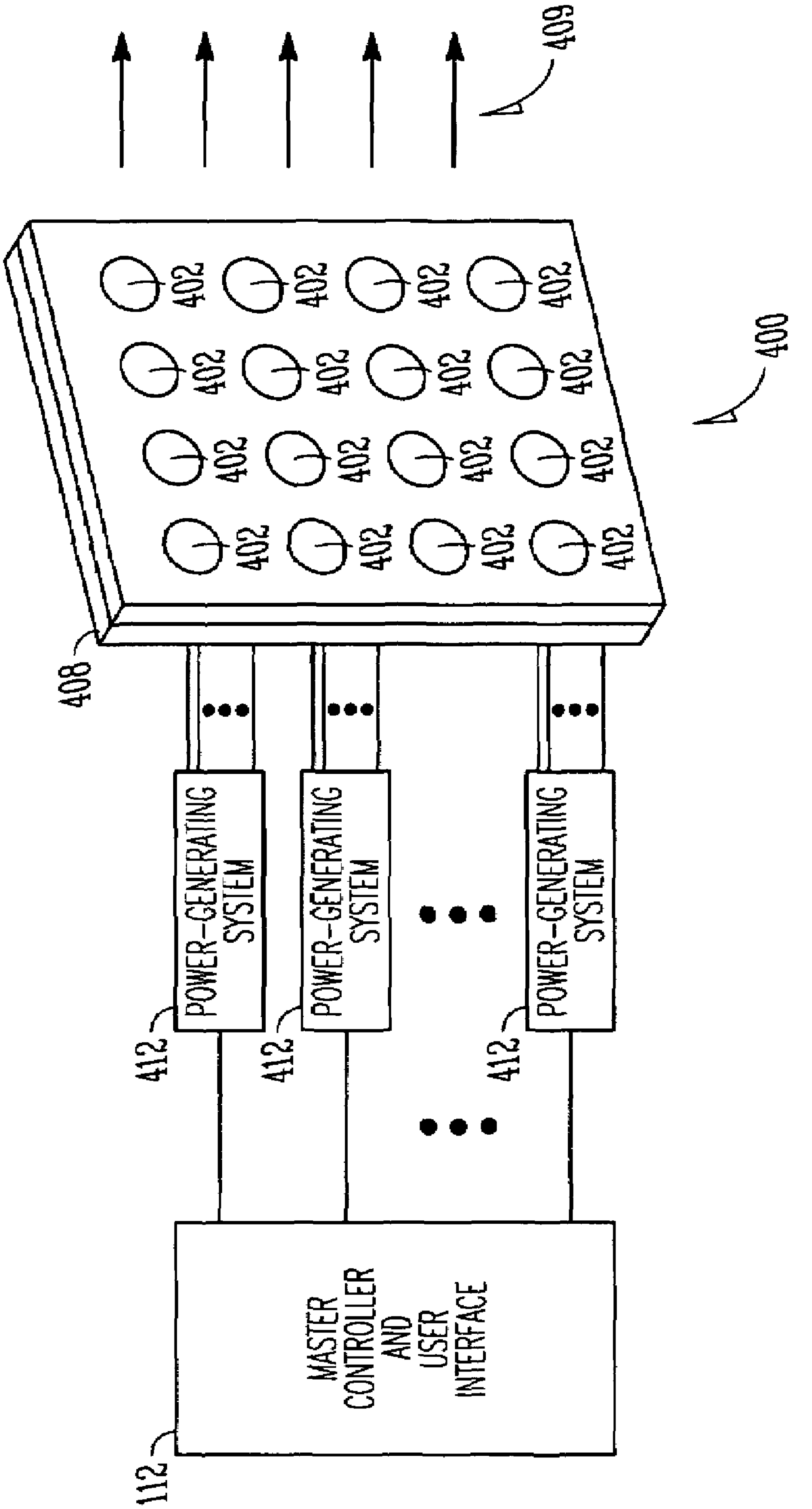
FIG. 4 is a functional block diagram of an active array antenna in accordance with some embodiments of the present invention.

FIG. 4 is a functional block diagram of an active array antenna system in accordance with some embodiments of the present invention. Active array antenna system 400 may generate high-power coherent wavefront 409. Active array antenna system 400 may comprise combining-radiating assembly 408 comprising a plurality of combining-radiating elements 402. Each combining-radiating element 402 may have a plurality of ports. Active array antenna system 400 may also include a plurality of power-generating systems 412. Each power-generating system 412 may be associated with one of combining-radiating elements 402 and may generate signals for each port of the associated combining-radiating elements 402. In some embodiments, each combining-radiating element 402 may comprise a conductive patch, such as patch 202 (FIG. 2A) or patch 302 (FIG. 3) although other types of combining-radiating element or patches may also be suitable.

In the embodiments illustrated in FIG. 4, combining-radiating assembly 408 may comprise an array of individual combining-radiating assemblies, such as an array of individual combining-radiating assembly 108 (FIG. 1). Each power-generating system 412 and an associated one of individual combining-radiating assembly 108 (FIG. 1) may correspond to power-combining system 100 (FIG. 1).

In FIG. 4, combining-radiating assembly 408 is illustrated as a 4×4 array of sixteen individual combining-radiating assemblies, although the scope of the invention is not limited in this respect as almost any number of combining-radiating assemblies may be used. In these embodiments, the coherent wavefront generated by each individual combining-radiating assembly may be combined in-phase. In some embodiments, master controller and user interface 112 may steer and/or direct combined high-power coherent wavefront 409. Accordingly, in these embodiments, a large amount of coherent energy may be directed toward a target.

In some embodiments, master controller and user interface 112 may include one or more controllers, such as controller 110 (FIG. 1), to provide for on-the-fly polarization by setting a phase of the signals at individual ports 114 (FIG. 1) of each combining-radiating elements 402 to selectively provide one of a right-hand circularly polarized wavefront, a left-hand circularly polarized wavefront, a horizontally polarized wavefront or a vertically polarized wavefront generated by each combining-radiating element 402. In these embodiments, this port-to port phase controls the polarization of the energy generated by each combining-radiating element 402. In these embodiments, master controller and user interface 112 may further control the element-to-element phase (i.e., the phase between combining-radiating elements 402) to determine the beam-steering direction, although the scope of the invention is not limited in this respect.

Although power-combining system 100 (FIG. 1) and active array antenna system 400 (FIG. 4) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of system 100 (FIG. 1) and system 400 (FIG. 4) may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A power combining system for generating a coherent high-power wavefront comprising:

a combining-radiating assembly comprising a conductive patch having a plurality of ports spaced around the patch;

phase controllers to generate signals with a predetermined phase shift for an associated one of the ports; and a plurality of coherent sources, each of the coherent sources to receive signals from an associated one of the phase controllers and to provide the signals to an associated port of the patch with the predetermined phase shifts, wherein energy from the ports is coherently combined and radiated by the patch to provide a coherent wavefront.

2. The power combining system of claim 1 further comprising a dual-directional coupler provided between each of the sources and each of the ports, each coupler configured to measure incident and reflected power at the associated port for use in setting the predetermined phase shift at each of the associated ports, wherein the signal generated by each of the coherent sources is phase-locked to the signal received from the associated phase controller.

3. A power combining system for generating a coherent high-power wavefront comprising:

a combining-radiating assembly comprising a conductive patch having a plurality of ports spaced around the patch;

phase controllers to generate signals with a predetermined phase shift for an associated one of the ports; and a plurality of coherent sources to receive signals from an associated one of the phase controllers and to provide the signals to an associated port of the combining-radiating assembly with the predetermined phase shifts, wherein energy from the ports is coherently combined and radiated by combining-radiating assembly to provide a coherent wavefront, wherein energy from the ports is coherently combined and radiated by the patch to provide the coherent wavefront, wherein the combining-radiating assembly comprises:

a first non-conductive substrate having the patch disposed thereon; and a second non-conductive substrate having conductive strips disposed thereon, each conductive strip signal-coupling one of the ports to the patch, the second non-conductive substrate further having a ground-plane disposed on a side opposite the conductive strips.

4. The power combining system of claim 3 wherein the patch has a circular shape and the ports are spaced uniformly around the patch.

5. The power combining system of claim 3 wherein the output signals comprise either microwave or millimeter-wave signals, and wherein each of the coherent sources provides an output signal whose phase is set by that of an input signal provided by the associated phase controller.

6. The power combining system of claim 5 wherein each of the coherent sources comprises a phase-locked oscillator to provide an output signal that is phase-locked to the associated input signal.

7. The power combining system of claim 5 wherein each coherent source comprises a solid-state amplifier.

8. The power combining system of claim 5 wherein each coherent source comprises a traveling-wave tube amplifier.

9. The power combining system of claim 5 wherein each coherent source comprises a klystron amplifier.

10. The power combining system of claim 3 further comprising a controller coupled to the phase controllers to provide on-the-fly polarization by setting a phase of the signals at the ports to selectively provide one of a right-hand circularly polarized wavefront, a left-hand circularly polarized wavefront, a horizontally polarized wavefront or a vertically polarized wavefront.

11. The power combining system of claim 3 further comprising a controller coupled to the phase controllers to set a phase progression of the signals at the ports around the patch to generate a circularly polarized wavefront, wherein the patch comprises a conductive material having either a substantially circular shape or a substantially regular polygonal shape.

12. The power combining system of claim 11 wherein the controller is to further set the phase shifts for each of the phase controllers based on an initial calibration for each port, and wherein the power combining system further comprises a memory to store a predetermined phase offset in memory for each port based on the initial calibration to provide the predetermined phase shift at each port during operation.

13. The power combining system of claim 11 wherein the combining-radiating assembly has N ports, wherein the phase progression set by the controller between the ports is 360 degrees divided by N, and wherein N is an integer greater than or equal to 3.

14. The power combining system of claim 13 wherein the combining-radiating assembly has four ports, wherein the controller sets a relative phase of the signals provided to a first of the ports to zero degrees, the relative phase of the signals provided to a second of the ports to +90 degrees, the relative phase of the signals provided to a third of the ports to +180 degrees, and the relate phase of the signals provided to a fourth of the ports to +270 degrees to generate a wavefront having right-hand circular polarization, and wherein the controller sets the relative phase of the signals provided to the first of the ports to zero degrees, the relative phase of the signals provided to the second of the ports to −90 degrees, the relative phase of the signals provided to the third of the ports to −180 degrees, and the relate phase of the signals provided to the fourth of the ports to −270 degrees to generate a wavefront having left-hand circular polarization.

15. The power combining system of claim 13 where in the combining-radiating assembly has eight ports spaced uniformly and radially around a perimeter of the patch, wherein the controller sets a relative phase of the signals provided to a first of the ports to zero degrees, the relative phase of the signals provided to a second of the ports to +45 degrees, the relative phase of the signals provided to a third of the ports to +90 degrees, the relative phase of the signals provided to a fourth of the ports to +135 degrees, the relative phase of the signals provided to a fifth of the ports to +180 degrees, the relative phase of the signals provided to a sixth of the ports to +225 degrees, the relative phase of the signals provided to a seventh of the ports to +270 degrees, and the relative phase of the signals provided to an eighth of the ports to +315 degrees to generate a wavefront having right-hand circular polarization, and wherein the controller sets the relative phase of the signals provided to the first of the ports to zero degrees, the relative phase of the signals provided to the second of the ports to −45 degrees, the relative phase of the signals provided to the third of the ports to −90 degrees, the relative phase of the signals provided to the fourth of the ports to −135 degrees, the relative phase of the signals provided to the fifth of the ports to −180 degrees, the relative phase of the signals provided to the sixth of the ports to −225 degrees, the relative phase of the signals provided to the seventh of the ports to −270 degrees, and the relative phase of the signals provided to then eighth of the ports to −315 degrees to generate a wavefront having left-hand circular polarization.

16. The power combining system of claim 3 further comprising a controller, wherein the combining-radiating assembly has four ports spaced substantially ninety degrees apart from each other around the patch, and wherein the controller sets a relative phase of signals provided to two adjacent ports to be substantially in phase with each other, and sets the relative phase of the signals provided to two opposite ports to be substantially 180 degrees to generate the wavefront having a linear polarization.

17. The power combining system of claim 3 wherein the ports of the combining-radiating assembly comprise electromagnetically-coupled ports, wherein each port comprises an open-ended conductive strip disposed on a non-conductive substrate to couple electromagnetic energy to the patch, and wherein the open-ended conductive strips extend and terminate under the patch.

18. A power combining system for generating a coherent high-power wavefront comprising:

a combining-radiating assembly having a plurality of ports;

phase controllers to generate signals with a predetermined phase shift for an associated one of the ports; and a plurality of coherent sources, each of the coherent sources to receive signals from an associated one of the phase controllers and to provide the signals to an associated port of the combining-radiating assembly with the predetermined phase shifts, wherein energy from the ports is coherently combined and radiated by the combining-radiating assembly to provide a coherent wavefront, wherein the signal generated by each of the coherent sources is phase-locked to the signal received from the associated phase controller, and wherein the combining-radiating assembly comprises either a circularly or a linear-polarized horn antenna having an integrated coaxial-to-waveguide combiner to coherently combine energy from the ports.

19. The power combining system of claim 18 further comprising a dual-directional coupler provided between each of the sources and each of the ports, each coupler configured to measure incident and reflected power at the associated port for use in setting the predetermined phase shift at each of the associated ports.

20. A method for generating a coherent high-power wavefront with a combining-radiating assembly comprising a conductive patch having a plurality of ports spaced around the patch, the method comprising:

generating high-power signals with a plurality of coherent sources, each of the signals generated with a predetermined phase shift for an associated one of the ports; and concurrently combining and radiating the signals received at each of the ports to provide a coherent high-power wavefront.

21. The method of claim 20 wherein the plurality of ports are spaced uniformly around the patch to provide the coherent high-power wavefront, wherein generating comprises setting a phase progression of the signals at the ports around the patch to generate a circularly polarized wavefront, and wherein the patch comprises a conductive material having either a substantially circular shape or a substantially regular polygonal shape.

22. The method of claim 21 wherein concurrently combining and radiating is performed by a combining-radiating assembly having N ports, wherein the phase progression set by the controller between the ports is 360 degrees divided by N, and wherein N is an integer greater than or equal to 3 inclusive.

23. The method of claim 22 further comprising:

setting the predetermined phase shifts for each of the ports based on an initial calibration for each port; and storing a predetermined phase offset in memory for each port based on the initial calibration to provide the predetermined phase shift at each port.

24. The method of claim 20 further comprising measuring incident and reflected power at the associated port for use in setting the predetermined phase shift at each of the associated ports, wherein the signal generated by each of the coherent sources is phase-locked to the signal received from an associated phase controller.

25. An active array antenna for generating a high-power coherent wavefront comprising:

a combining-radiating assembly comprising a conductive patch having a plurality of ports spaced around the patch;

a plurality of power-generating systems, each associated with one of the combining-radiating elements to generate signals for each port of the associated combining-radiating element, wherein each power-generating system comprises a phase controller to generate signals with a predetermined phase shift for an associated one of the ports and a plurality of coherent sources, each of the coherent sources to receive signals from an associated one of the phase controllers and to provide the signals to an associated port of the patch with the predetermined phase shifts, wherein energy from the ports is coherently combined and radiated by the patch to provide a coherent wavefront.

26. The active array antenna of claim 25 wherein the signal generated by each of the coherent sources is phase-locked to the signal received from the associated phase controller.

27. The active array antenna of claim 26 further comprising a controller coupled to the phase controllers to set a phase progression of the signals at the ports around each of the patches to generate a circularly polarized wavefront by each patch, wherein each patch comprises a conductive material having either a substantially circular shape or a substantially regular polygonal shape.

28. The active array antenna of claim 25 further comprising a controller coupled to the phase controllers to provide on-the-fly polarization by setting a phase of the signals at the ports to selectively provide one of a right-hand circularly polarized wavefront, a left-hand circularly polarized wavefront, a horizontally polarized wavefront or a vertically polarized wavefront.

29. The active array antenna of claim 26 further comprising a dual-directional coupler provided between each of the sources and each of the ports, each coupler configured to measure incident and reflected power at the associated port for use in setting the predetermined phase shift at each of the associated ports.

30. An active array antenna for generating a high-power coherent wavefront comprising:

a combining-radiating assembly comprising a plurality of combining-radiating elements having a plurality of ports;

a plurality of power-generating systems, each associated with one of the combining-radiating elements to generate signals for each port of the associated combining-radiating element, wherein each power-generating system comprises a phase controller to generate signals with a predetermined phase shift for an associated one of the ports and a plurality of coherent sources to receive signals from an associated one of the phase controllers and to provide the signals to an associated port of the combining-radiating assembly with the predetermined phase shifts, wherein energy from the ports is coherently combined and radiated by the combining-radiating elements to provide a coherent wavefront, wherein each of the combining-radiating elements comprises a conductive patch, each conductive patch having the plurality of ports spaced around the patch, wherein each of the combining-radiating elements comprises:

a first non-conductive substrate having one of the patches disposed thereon; and a second non-conductive substrate having conductive strips disposed thereon, each conductive strip signal-coupling one of the ports to the associated patch, the second non-conductive substrate further having a ground-plane disposed on a side opposite the conductive strips.

31. The active array antenna of claim 30 wherein the ports of each of the combining-radiating elements comprise electromagnetically-coupled ports, wherein each port comprises an open-ended conductive strip disposed on a non-conductive substrate to couple electromagnetic energy to the associated patch, and wherein the open-ended conductive strips extend and terminate under the patch.

* * * * *

UNITED STATES PATENT AND TRADEMARK OFFICE

CERTIFICATE OF CORRECTION

PATENT NO. : 7,800,538 B2
APPLICATION NO. : 11/588794
DATED : September 21, 2010
INVENTOR(S) : David Crouch et al.

It is certified that error appears in the above-identified patent and that said Letters Patent is hereby corrected as shown below:

In column 3, line 4, delete "30gigahertz" and insert -- 30 gigahertz --, therefor.

In column 9, line 42, in Claim 14, delete "relate" and insert -- relative --, therefor.

In column 9, line 51, in Claim 14, delete "relate" and insert -- relative --, therefor.

Signed and Sealed this

Sixteenth Day of November, 2010

David J. Kappos

*Director of the United States Patent and Trademark Office*